T. J. SMITH.
COTTON CHOPPER.
APPLICATION FILED MAR. 16, 1910.

971,698.

Patented Oct. 4, 1910.
7 SHEETS—SHEET 3.

T. J. SMITH.
COTTON CHOPPER.
APPLICATION FILED MAR. 16, 1910.

971,698.

Patented Oct. 4, 1910.
7 SHEETS—SHEET 5.

Fig 5.

Witnesses
Thos. Eisenmann.
R. H. Krenkel.

Inventor
Taylor J. Smith,
By Joshua R. H. Potts,
Attorney

T. J. SMITH.
COTTON CHOPPER.
APPLICATION FILED MAR. 16, 1910.

971,698.

Patented Oct. 4, 1910.
7 SHEETS—SHEET 6.

Witnesses

Inventor
Taylor J. Smith,
By Joshua R. H. Potts
Attorney

UNITED STATES PATENT OFFICE.

TAYLOR J. SMITH, OF BIRMINGHAM, ALABAMA, ASSIGNOR OF ONE-HALF TO GILES H. SMITH, OF MIAMI, MISSOURI.

COTTON-CHOPPER.

971,698.            Specification of Letters Patent.        Patented Oct. 4, 1910.

Application filed March 16, 1910. Serial No. 549,682.

*To all whom it may concern:*

Be it known that I, TAYLOR J. SMITH, a citizen of the United States, residing at Birmingham, in the county of Jefferson and State of Alabama, have invented certain new and useful Improvements in Cotton-Choppers, of which the following is a specification.

My invention relates to improvements in cotton choppers, the object of the invention being to provide improvements in machines of this character in which a concavo-convex chopping disk is employed and a continuous revolving intermittently oscillating movement is transmitted to the disk to chop out the cotton.

A further object is to provide an improved sulky machine of this character, with an improved vertically movable frame supported thereby, and carrying the concavo-convex chopping disk with improved means on the vertically movable frame for transmitting an intermittently oscillating movement to the disk, improved means for raising and lowering the frame and disk, and improved means for regulating the depth of cutting by the disk.

A further object is to provide improved mounting for a concavo-convex chopping disk, improved means for transmitting a rotary motion to said disk, improved mechanism for transmitting an oscillating movement to said disk, and improved mechanism for controlling the operation of said transmission means.

A further object is to provide improvements of this character with an improved mounting for a concavo-convex chopping disk which disposes the disk at an angle to the line of draft, improved means for transmitting a continuous rotary movement to said disk, and a lever, and eccentric for transmitting intermittently an oscillating movement to the disk, as the chopper moves over the ground to leave hills of cotton at regular intervals throughout the row.

A further object is to provide improvements of this character with an improved concavo-convex chopping disk, disposed at an angle to the line of draft, with means for transmitting a rotary movement to said disk to throw to one side, the chopped out cotton, and provide an improved vertically movable frame supporting the disk, an improved eccentric on the vertically movable frame, improved means for transmitting rotary motion to the eccentric, a lever fulcrumed between its ends in the vertically movable frame, and connected at its lower end to the disk supporting shaft, and the upper end of said lever engaging the eccentric, whereby an intermittent oscillatory motion is imparted to the lever to, at regular intervals, move the disk outward and upward, and return it to normal position as the machine moves over the ground, to leave unchopped hills of cotton regularly spaced apart.

A further object is to provide a cotton chopper with an improved supporting frame having axle stubs thereon, mounted in traction wheels with an improved vertically movable frame, pivotally connected to the supporting frame, with improved means for raising and lowering the movable frame, and said movable frame supporting a concavo-convex chopping disk, and carrying means for intermittently transmitting an oscillatory movement to the disk, and said supporting frame carrying means for transmitting a rotary motion to said disk.

A further object is to provide improvements of this character with an improved concavo-convex chopping disk, improved mechanism for transmitting a continuous rotary motion to said disk, and an intermittent oscillatory movement to the disk, and improved means for throwing in and out, either of said transmission means.

With these and other objects in view, the invention consists in certain novel features of construction, and combinations and arrangements of parts as will be more fully hereinafter described and pointed out in the claims.

In the accompanying drawings.

1, represents a rectangular, substantially horizontally disposed channel-iron base frame, which is provided at its front end with the arch 2, and at a point near its rear end with a second arch 3. These arches 2, and 3, are also preferably of channel-iron, and are secured to the base frame 1. These parts 1, 2, and 3, constitute what I term a supporting frame, which serves as a support for the operating mechanism of the chopper, but the lower part 1, I term a base frame for convenience of description, as will hereinafter appear.

Axle stubs 4, are securely bolted to the supporting frame at the juncture of base frame 1, and rear arch 3, and are mounted in traction wheels 5. A seat bar 6, is secured to the arch 3, and to an arched brace 7, and supports a seat 8, which is located in convenient reach of the several levers, to control the machine as will hereinafter appear.

Figure 3:
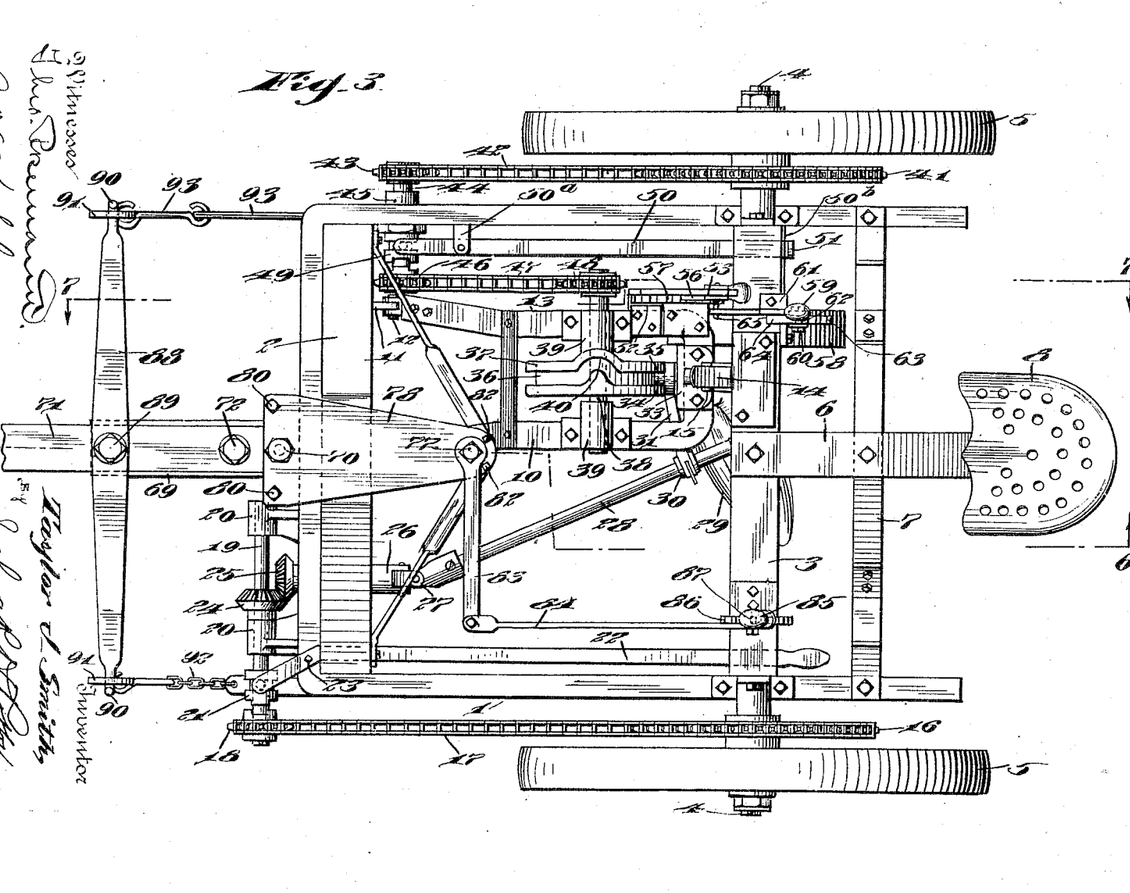
Fig. 3, is a top plan view.
Figure 6:
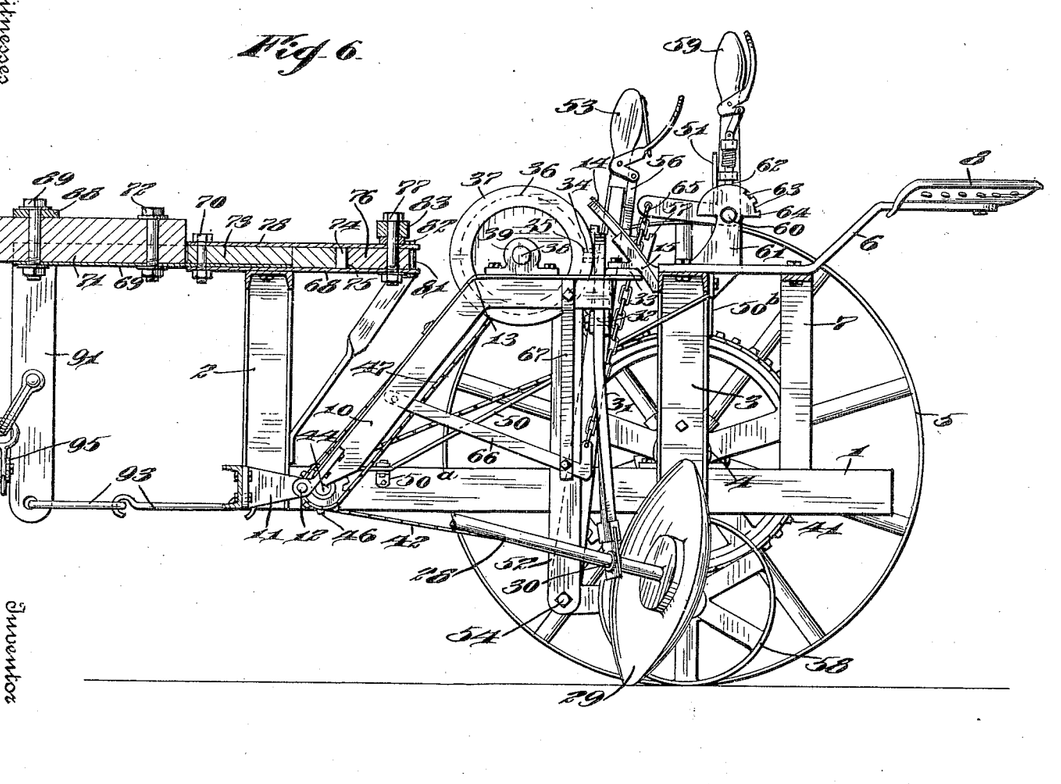
Fig. 6, is a view in longitudinal section, on the line 6, 6, of Fig. 3.
Figure 7:
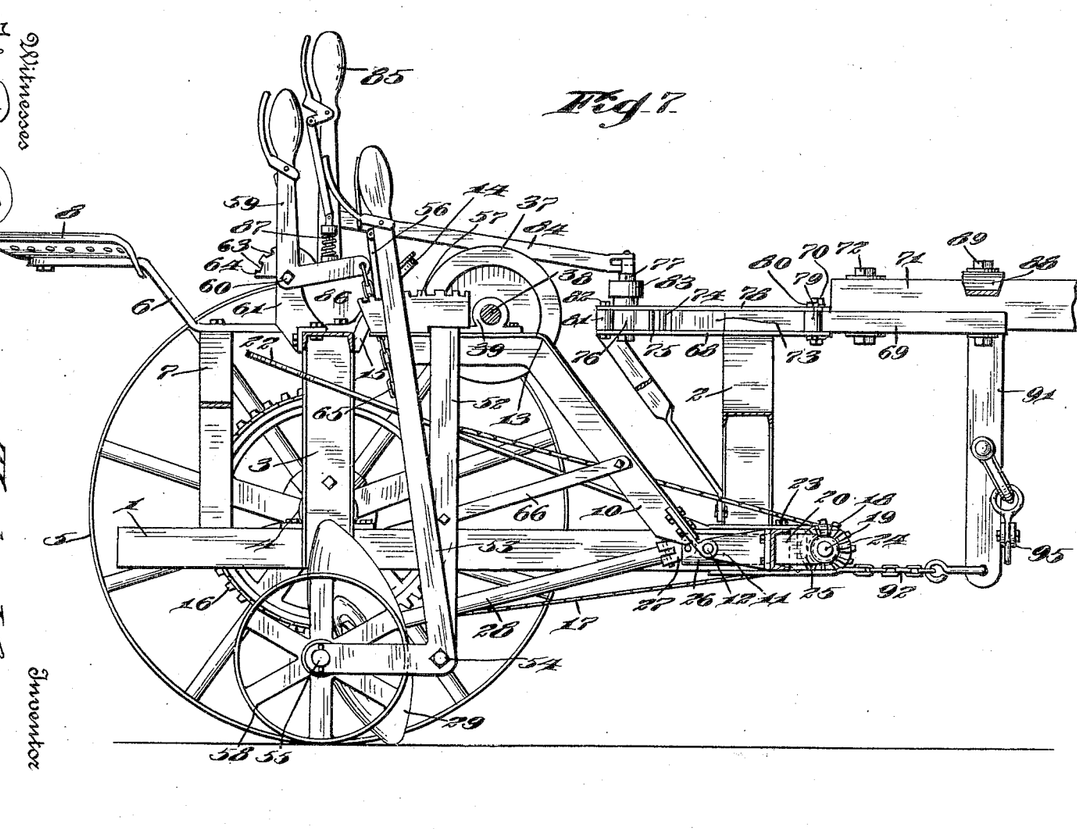
Fig. 7, is a view in longitudinal section, on the line 7, 7, of Fig. 3.

A vertically movable frame 10, of general U-shape in plan, as seen in Fig. 3, is pivotally connected at its lower forward ends to lugs 11, on the forward member of base frame 1. That is to say, the forward ends of members of frame 10, are bifurcated to receive the lugs 11, and pivot pins 12, are positioned in alined openings in the frame and lugs, to permit a free vertical pivotal movement of frame 10. By reference to Figs. 1, 2, 6, and 7, it will be seen that this movable frame 10, while its forward ends connect to base frame 1, has a general upward slope to a point 13, and then extends rearward in a general horizontal plane, approximately in the same plane as the upper faces of arches 2, and 3. The movement of this frame 10, is guided by a curved guide bracket 14, secured to the rear arch 3, and on which a grooved slide 15 moves, as shown in Fig. 6. The slide 15, is bolted to the rear end of frame 10, and not only serves to guide the vertical pivotal movement of the frame, but also prevents lateral movement of the frame, and relieves the latter of such strains and stresses that naturally come thereon.

A large sprocket wheel 16, is secured on the hub of the left hand wheel 5, and transmits motion to an endless sprocket chain 17, which latter, in turn, transmits motion to a small sprocket wheel 18, loose on a short shaft 19, mounted in bearings 20, on the front bar of base frame 1. The sprocket wheel 18, is moved into and out of locked engagement with shaft 19, by means of a slide clutch 21, operated by a lever 22, pivoted to base frame 1, by a pivot 23, and terminating at the rear of the machine, in convenient reach of the operator's foot, so that he may, with his left foot, move lever 22, to throw the clutch 21, in and out.

A beveled gear 24, on shaft 19, engages a beveled gear 25, on a short shaft 26, mounted in a suitable bearing in the front cross bar of base frame 1, and connected by a universal joint 27, with a shaft 28. The shaft 28, is located at an angle to the line of draft, and on the rear end of this shaft 28, a concavo-convex chopping disk 29, is secured. Shaft 28, is mounted to turn in a bearing 30, at the lower end of a lever 31, said lever 31, being fulcrumed between its ends on a pin 32, which projects through an opening in the lever, and is secured to a metal bracket 33, fast to frame 10. The upper end of lever 31, is located inside of frame 10, and is provided with a stud 34, on which a roller 35, is mounted, and is positioned in the groove 36, of an eccentric wheel 37. The eccentric wheel 37, is secured upon a shaft 38, mounted in bearings 39, on frame 10, and it will be noted that the groove 36, is in the same plane circumferentially of the wheel, throughout the wheel, except at one point as shown at 40, where the groove extends to one side, and when this portion of the groove engages the roller 34, the lever 31, will be swung on its fulcrum to transmit to shaft 28, and disk 29, an oscillatory movement.

On the hub of the right hand wheel 5, a large sprocket wheel 41, is secured, and is connected by an endless sprocket chain 42, with a small sprocket wheel 43, on a transversely disposed short shaft 44, mounted in a suitable bearing 45, on the right hand side bar of base frame 1, and projects inwardly as shown. A sprocket wheel 46, is mounted loosely on shaft 44, and is connected by a sprocket chain 47, with a sprocket wheel 48, on shaft 38.

49, represents a clutch which is adapted to be moved by lever 50, to lock the sprocket wheel 46, to turn with the shaft 44, or to permit the shaft to turn without transmitting motion to the sprocket wheel 46. This lever 50, is fulcrumed between its ends on a bracket 50$^a$, and extends rearwardly, and has an upwardly projecting end 51, located in convenient reach of the operator's right foot, so that he can with his right foot, move this lever to throw the clutch 49, in and out.

A vertical bar 52, is secured to, and extends downward from, the movable frame 10, and at its lower end, an L-shaped lever 53, is pivotally connected by means of a bolt 54. The upwardly projecting long member of this lever 53, has a handle thereon, located in convenient reach of the operator on seat 8, and is provided with a detent 56, to engage a notched segment 57, on frame 10, to lock the lever at various adjustments. The shorter horizontal member of this lever 53, projects rearward and a pin 55, mounted in this rear end of the lever, serves as a journal for a small wheel 58. The purpose of this wheel 58, is to regulate the depth of cutting by the chopping disk 29, as will more fully hereinafter appear.

Figure 1:
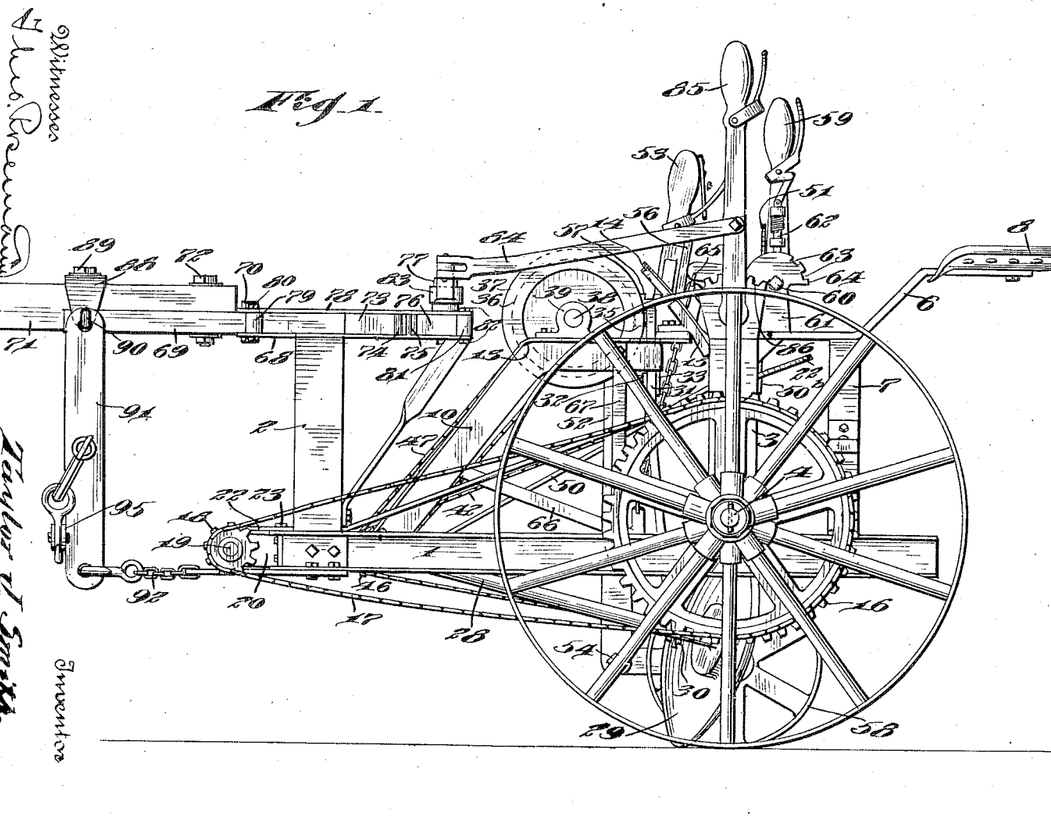
Figure 1, is a view in side elevation illustrating my improvements.
Figure 2:
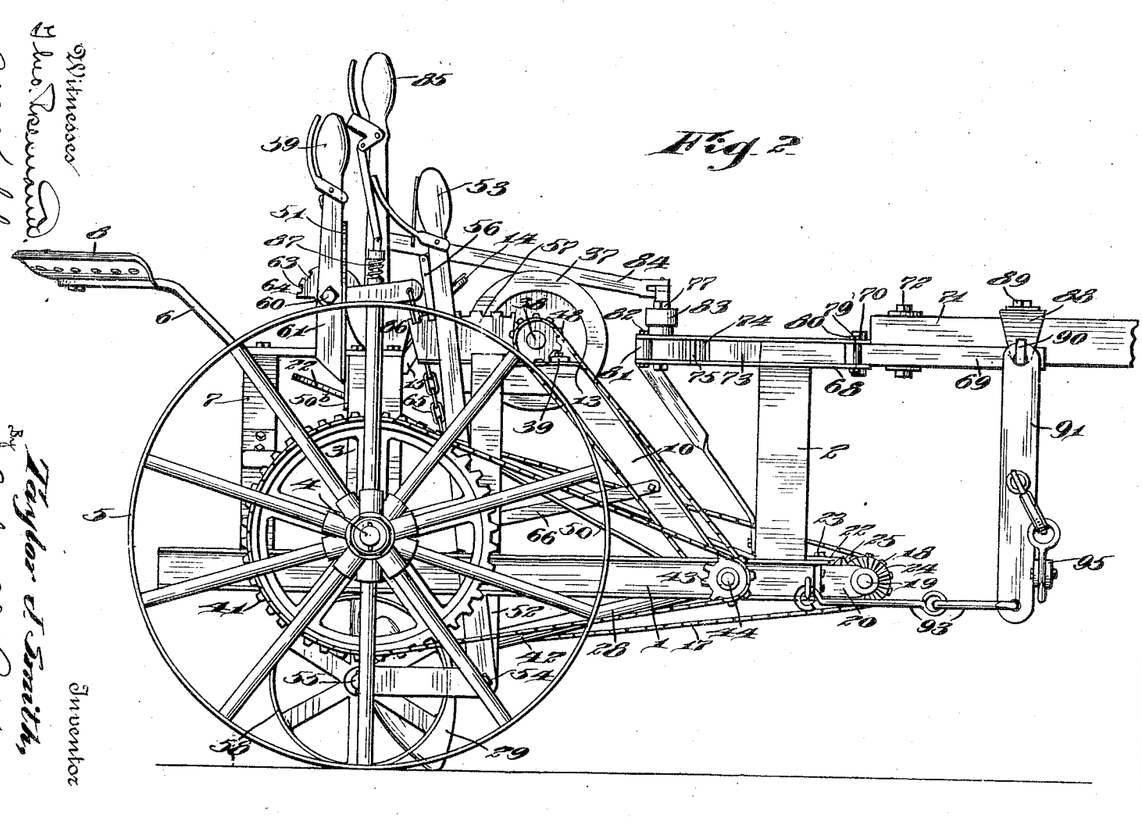
Fig. 2, is a view in elevation of the opposite side of the machine.

To raise and lower the frame 10, and the parts carried thereby, a bell crank lever 59, is fulcrumed on a bolt 60, secured in a bracket 61, on the rear arch 3. This lever 59, is provided with a spring pressed detent 62, adapted to engage in two notches 63, in a segment 64, secured to rear arch 3. But two notches are provided in this segment 64, as that is all that is necessary for the normal operation. Fig. 1, shows the detent 62, out of both of these notches, as the disk 29, is down in working position, and when the frame 10, is elevated, the detent 62, will project into either of the notches 63, to hold the frame 10, wheel 58, and the chopping disk elevated, to permit the device to turn readily at the end of a row, or to move from place to place. The lever 59, which accomplishes this lifting operation, is connected by a chain 65, with a rearwardly projecting bar 66, having an upturned end as shown in Fig. 6, and strengthened by vertical brace 67.

On the front arch 2, at its center, a plate 68, is rigidly secured, and a channeled tongue socket 69 is pivotally connected to said plate by means of a bolt 70. In this tongue socket 69, tongue 71 is secured by bolts 72, and also in this tongue socket 69, at its rear end, a block 73 is located and held in position by means of bolt 70. The rear end of this block 73 is made in the form of a toothed segment 74, which meshes with the toothed segment 75 on the forward end of a block 76, the latter keyed to a vertical bolt 77, mounted in plate 68 and supported to turn.

An upper plate 78, conforming in shape to the supporting plate 68, is located above the blocks 73, and 76, and covers them to protect them from the weather. Between the plates 68 and 76, and adjacent the tongue socket 69, in line with pivot bolt 70, spacing sleeves 79, which constitute rollers are supported on bolts 80, secured in the plates, and similar spacing sleeves or rollers 81, are supported on bolts 82, located adjacent the rear end of block 76.

The bolt 77, projects above plate 78, and a lateral projecting crank arm 83, is keyed to the bolt 77, and securely held thereon. The free end of this crank arm 83 is connected by a link 84, with a lever 85. Lever 85 is fulcrumed on a segment 86, on rear arch 3, and is provided with a detent 87, to engage the segment 86, and lock the lever at various adjustments. When the lever is swung, bolt 77 and block 76 will be turned so as to swing block 73, and the tongue 71, thus moving the tongue relative to the frame of the machine to guide the draft animals by this movement of the tongue, or rather, to guide the machine relative to the row of cotton regardless of the tangential pull of the draft animals on the machine.

A cross bar 88 is secured between its ends on tongue 71, near the rear end of the latter, by means of a bolt 89, which gives to the bar a certain pivotal movement. This bar 88 is provided with hooked ends 90, which are positioned through the perforated upper ends of vertical links 91, the lower ends of said links being connected to the base frame 1. The connecting mechanism illustrated constitutes a chain 92, at one side, and hooked rods 93 at the other side, but the particular connecting devices between the lower ends of the links and the base frame are not material, and may be varied at will, sufficient that a strong device be provided to sustain the draft as practically the entire pull of the draft animals comes on these connecting devices, and hence the draft is in line with the greatest resistance low to the ground, where it is most needed. The links 91, are perforated between their ends as shown at 94, to couple swingletrees 95, thereto, for the attachment of the draft animals.

The operation is as follows: As the machine is drawn over the ground, with the chopping disk 29, movable along the row of cotton, and disposed at an angle to the line of draft, it will chop out the cotton, and throw it to one side by reason of the angle of the disk, and its rotary and oscillatory movement. While moving along the row, the left hand wheel 5, through the medium of sprocket wheel 16, chain 17, and sprocket wheel 18, revolves shaft 19. Shaft 19, through the medium of gears 24, and 25, transmits a rotary motion to shafts 26, and 28, to continuously revolve disk 29. At the same time, the right hand wheel 5, through the medium of sprocket wheel 41, chain 42, and sprocket wheel 43, turns shaft 44. This shaft 44, through the medium of sprocket wheel 46, chain 47, and sprocket wheel 48, transmits a continuous rotary motion to shaft 38, and eccentric wheel 37. As the eccentric wheel 37, revolves, when the grooved portion 40, engages the roller 34, at the upper end of lever 31, it will cause the lever to swing on its fulcrum, and as the lower end of the lever 31, has a bearing 30, in which shaft 28, revolves, this movement of the lever will throw the disk 27, outward and upward, and then return it to its normal chopping position. This outward and upward movement of the disk, which I term an oscillating movement, not only throws out the chopped cotton and trash, but also such movement insures some of the cotton plants being left, and as this lateral oscillating movement occurs at regular intervals, the hills of unchopped cotton will be regularly spaced an equal distance apart throughout the row. To regulate the depth of cutting of the disk 29, the roller 58, is provided controlled by lever 53. When the upper end of lever 53, is moved rearward, wheel 58, is forced downward which tends to elevate the frame 10, and hence elevate the disk 29. When the forward end of lever 53, is thrown forward, wheel 58 will be elevated and the disk 29 allowed to cut more deeply into the ground. When the machine reaches the end of a row, the operator on seat 8, pulls lever 59, rearward which elevates frame 10, disk 29, and roller 58, allowing the machine to turn readily and this lever is also thrown backward and locked in either of the two notches 63, in segment 64, when the machine is to be transported from place to place. At such time, he would of course, operate the levers 50 and 22, to throw the clutches 49, and 21, respectively to a position which will allow the wheels 5, to turn without operating the mechanism of the machine.

Figure 4:
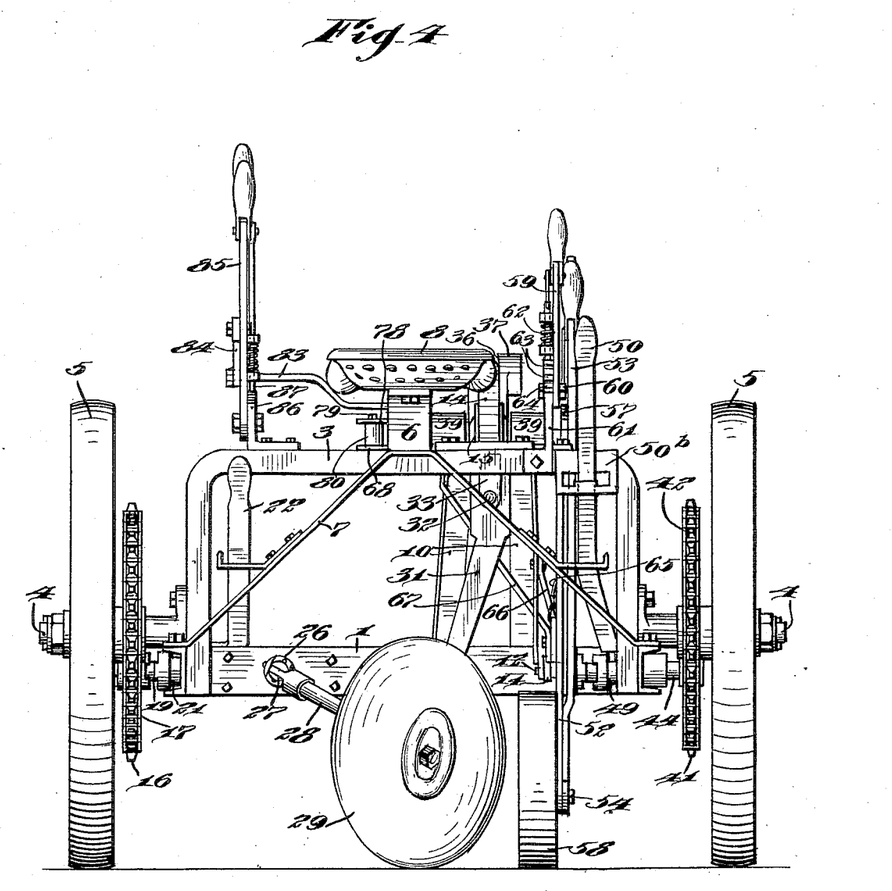
Fig. 4, is a rear view.
Figure 5:
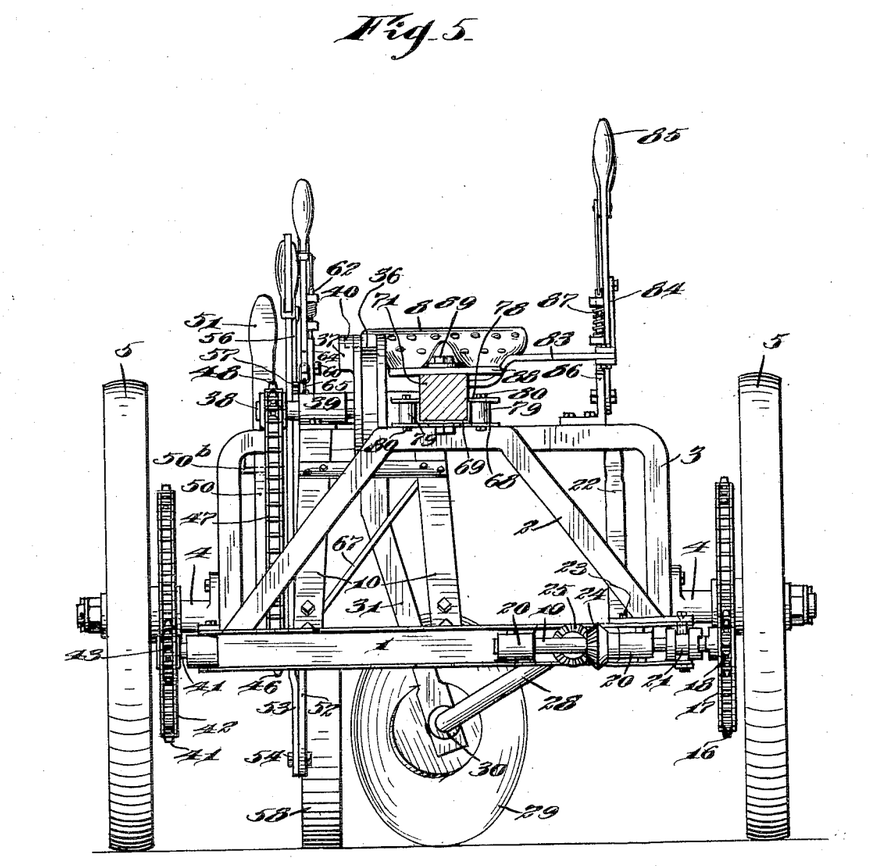
Fig. 5, is a front view, with parts removed to more clearly show the structure.

While I have referred to the levers 22, and 50, as being operated by the feet, they may of course be operated by hand, and as seen in Fig. 4, the lever 50, is provided with a notch plate 50ᵇ, to hold the lever in either of its two operative positions.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention what I claim as new and desire to secure by Letters Patent is:

1. In a cotton chopper, the combination with a frame, of a chopping disk, means transmitting a continuous rotary movement to the disk, and means intermittently oscillating said disk, substantially as described.

2. In a cotton chopper, the combination with a frame and wheels supporting the frame, of a concavo-convex disk supported by the frame and disposed at an angle to the line of draft, means transmitting rotary motion from one of said wheels to said disk, and means operated by the other of said wheels to oscillate said disk, substantially as described.

3. In a cotton chopper, the combination with a frame, of a chopping disk disposed at an angle to the line of draft, means transmitting a continuous rotary movement to said disk, and means intermittently oscillating said disk, substantially as described.

4. In a cotton chopper, the combination with a supporting frame, and wheels at opposite sides of the frame, of a chopping disk supported by the frame, means operated by one wheel for revolving the disk, and means operated by the other wheel for intermittently oscillating the disk, substantially as described.

5. In a cotton chopper, the combination with a supporting frame, and wheels at opposite sides of the frame, of a concavo-convex chopping disk supported at an angle to the line of draft, means operated by one wheel for revolving the disk, and means operated by the other wheel for intermittently oscillating the disk, substantially as described.

6. In a cotton chopper, the combination with a supporting frame, of a power transmitting shaft supported in the frame, a shaft disposed at an angle to the first mentioned shaft, a universal joint connecting said shafts, a disk secured on said last mentioned shaft, and means for intermittently swinging said last mentioned shaft and disk outward and upward, substantially as described.

7. In a cotton chopper, the combination with a supporting frame, of a power transmitting shaft supported in the frame, a shaft disposed at an angle to the first mentioned shaft, a universal joint connecting said shafts, a disk secured on the last mentioned shaft, a lever fulcrumed between its ends, a bearing on the lower end of said lever in which the disk supporting shaft turns, and means for intermittently oscillating said lever, substantially as described.

8. In a cotton chopper, the combination with a supporting frame, of a power transmitting shaft supported in the frame, a shaft disposed at an angle to the first mentioned shaft, a universal joint connecting said shafts, a disk secured on the last mentioned shaft, a lever fulcrumed between its ends, a bearing on the lower end of said lever in which the disk supporting shaft turns, and an eccentric engaging the upper end of the lever to intermittently oscillate the lever, substantially as described.

9. In a cotton chopper, the combination with a supporting frame, of a power transmitting shaft supported in the frame, a shaft disposed at an angle to the first mentioned shaft, a universal joint connecting said shafts, a disk secured on the last mentioned shaft, a lever fulcrumed between its ends, a bearing on the lower end of said lever in which the disk supporting shaft turns, an eccentric engaging the upper end of the lever to intermittently oscillate the lever, a vertically movable frame supporting said eccentric and lever, and means for moving said movable frame to elevate the chopping disk, substantially as described.

10. In a cotton chopper, the combination with a supporting frame, and traction wheels at opposite sides of the frame, of a longitudinal power transmitting shaft supported in the frame, a shaft disposed at an angle to the first mentioned shaft, a universal joint connecting said shafts, a disk secured on the rear end of the last mentioned shaft, a movable frame having pivotal connection with the supporting frame, a lever constructed to raise and lower the movable frame, an eccentric wheel supported by the movable frame, a lever fulcrumed between its ends to said movable frame, a bearing at the lower end of the last mentioned lever, in which the disk carrying shaft is mounted, and a roller at the upper end of said lever located in an eccentric groove in the eccentric wheel, substantially as described.

11. In a cotton chopper, the combination with a supporting frame, and traction wheels at opposite sides of the frame, of a longitudinal power transmitting shaft supported in the frame, a shaft disposed at an angle to the first mentioned shaft, a universal joint connecting said shafts, a disk secured on the rear end of the last mentioned shaft, a movable frame having pivotal connection with the supporting frame, a lever constructed to raise and lower the movable frame, an eccentric wheel supported by the movable frame, a lever fulcrumed between its ends to said movable frame, a bearing at the lower end of the last mentioned lever, in which the disk carrying shaft is mounted, and a roller at the upper end of said lever located in an eccentric groove in the eccentric wheel, means transmitting motion from one of the traction wheels to the first mentioned shaft, and means transmitting motion from the other traction wheel to the eccentric, substantially as described.

12. In a cotton chopper, the combination with a supporting frame, and traction wheels at opposite sides of the frame, of a longitudinal power transmitting shaft supported in the frame, a shaft disposed at an angle to the first mentioned shaft, a universal joint connecting said shafts, a disk secured on the rear end of the last mentioned shaft, a movable frame having pivotal connection with the supporting frame, a lever constructed to raise and lower the movable frame, an eccentric wheel supported by the movable frame, a lever fulcrumed between its ends to said movable frame, a bearing at the lower end of the last mentioned lever, in which the disk carrying shaft is mounted, and a roller at the upper end of said lever located in an eccentric groove in the eccentric wheel, a bar depending from the movable frame, an L-shaped lever pivoted to said bar, and a roller connected to said lever and engaging the ground, substantially as described.

13. In a cotton chopper, the combination with traction wheels, and a frame supported in the wheels, of a shaft supported at an angle to the line of draft of the machine, a concavo-convex chopping disk on said shaft, a lever fulcrumed between its ends, a bearing at one end of said lever in which said shaft is mounted, an eccentric wheel engaging the other end of said lever to intermittently oscillate the lever, and means transmitting rotary motion from the traction wheels to said shaft and eccentric wheel, substantially as described.

14. In a cotton chopper, the combination with traction wheels, and a frame supported in the wheels, of a shaft supported at an angle to the line of draft of the machine, a concavo-convex chopping disk on said shaft, a lever fulcrumed between its ends, a bearing at one end of said lever in which said shaft is mounted, an eccentric wheel engaging the other end of said lever to intermittently oscillate the lever, means transmitting rotary motion from the traction wheels to said shaft and eccentric wheel, and means for adjusting said disk vertically, substantially as described.

15. In a cotton chopper, the combination with traction wheels, and a frame supported in the wheels, of a shaft supported at an angle to the line of draft of the machine, a concavo-convex chopping disk on said shaft, a lever fulcrumed between its ends, a bearing at one end of said lever in which said shaft is mounted, an eccentric wheel engaging the other end of said lever to intermittently oscillate the lever, means transmitting rotary motion from the traction wheels to said shaft and eccentric wheel, a vertically movable frame supporting the eccentric wheel, a lever constructed to raise and lower the movable frame, a second lever, and a small wheel normally on the ground, connected to the last mentioned lever, and adapted to be moved thereby to adjust the disk vertically, substantially as described.

16. In a cotton chopper, the combination with wheels, of a channel-iron rectangular base frame, front and rear transverse arches connecting the side members of the base frame, axle stubs secured to the rear arch and base frame, and mounted in the wheels, a vertically movable frame pivotally connected to the front bar of the base frame, an eccentric wheel supported on the movable frame, a shaft supported on the front bar of the base frame, sprocket wheels on said shaft and on one of the traction wheels, a chain connecting said sprocket wheels, a longitudinal shaft supported in the front bar of the base frame, gearing between said shafts, a disk carrying shaft disposed at an angle to the line of draft, a universal joint connecting said disk carrying shaft and the longitudinal shaft, a disk on the disk carrying shaft, means transmitting motion from one of said traction wheels to said eccentric wheel, a lever fulcrumed between its ends to said movable frame, a roller on said lever in a groove of the eccentric wheel, and a bearing on the lower end of said lever in which the disk carrying shaft is mounted to turn, substantially as described.

17. In a cotton chopper, the combination with wheels, of a channel-iron rectangular base frame, front and rear transverse arches connecting the side members of the base frame, axle stubs secured to the rear arch and base frame, and mounted in the wheels, a vertically movable frame pivotally connected to the front bar of the base frame, an eccentric wheel supported on the movable frame, a shaft supported on the front bar of the base frame, sprocket wheels on said shaft and on one of the traction wheels, a chain connecting said sprocket wheels, a longitudinal shaft supported in the front bar of the base frame, gearing between said shafts, a disk carrying shaft disposed at an angle to the line of draft, a universal joint connecting said disk carrying shaft and the longitudinal shaft, a disk on the disk carrying shaft, means transmitting motion from one of said traction wheels to said eccentric wheel, a lever fulcrumed between its ends to said movable frame, a roller on said lever in a groove of the eccentric wheel, and a bearing on the lower end of said lever in which the disk carrying shaft is mounted to turn, a lever constructed to raise and lower the movable frame, and means regulating the depth of cutting of said disk, substantially as described.

18. In a cotton chopper, the combination with wheels, of a channel-iron rectangular base frame, front and rear transverse arches connecting the side members of the base frame, axle stubs secured to the rear arch and base frame, and mounted in the wheels, a vertically movable frame pivotally connected to the front bar of the base frame, an eccentric wheel supported on the movable frame, a shaft supported on the front bar of the base frame, sprocket wheels on said shaft and on one of the traction wheels, a chain connecting said sprocket wheels, a longitudinal shaft supported in the front bar of the base frame, gearing between said shafts, a disk carrying shaft disposed at an angle to the line of draft, a universal joint connecting said disk carrying shaft, and the longitudinal shaft, a disk on the disk carrying shaft, means transmitting motion from one of said traction wheels to said eccentric wheel, a lever fulcrumed between its ends to said movable frame, a roller on said lever in a groove of the eccentric wheel, and a bearing on the lower end of said lever in which the disk carrying shaft is mounted to turn, a lever constructed to raise and lower the movable frame, a depending bar on the movable frame, an L-shaped lever pivotally secured at its angle to said bar, a wheel carried by the rearwardly projecting member of said lever, and means for locking said levers at various positions of adjustment, substantially as described.

19. In a cotton chopper, the combination with wheels, of a channel-iron rectangular base frame, front and rear transverse arches connecting the side members of the base frame, axle stubs secured to the rear arch and base frame, and mounted in the wheels, a vertically movable frame pivotally connected to the front bar of the base frame, a curved guide bracket secured to the rear arch, a slide secured to the movable frame and movable on the guide bracket, a chopping disk, means for revolving said disk, and means on the vertically movable frame for imparting an intermittent oscillating movement to the disk, substantially as described.

20. In a cotton chopper, the combination with wheels, of a channel-iron rectangular base frame, front and rear transverse arches connecting the side members of the base frame, axle stubs secured to the rear arch and base frame, and mounted in the wheels, a vertically movable frame pivotally connected to the front bar of the base frame, a curved guide bracket secured to the rear arch, a slide secured to the movable frame and movable on the guide bracket, a chopping disk, means on the movable frame connected with said disk, and adapted to intermittently oscillate the same, a lever on the rear arch, and a chain connecting said lever with the vertically movable frame whereby said frame may be moved by the lever, substantially as described.

In testimony whereof I have signed my name to this specification in the presence of two subscribing witnesses.

TAYLOR J. SMITH.

Witnesses:
D. R. RIDENHOUR,
C. E. BURRELL.